United States Patent
Green

(10) Patent No.: US 10,415,359 B2
(45) Date of Patent: Sep. 17, 2019

(54) HYDRAULIC FRACTURING IN HIGHLY HETEROGENEOUS FORMATIONS BY FLUID SELECTION BASED ON FRACTURE SURFACE ROUGHNESS

(71) Applicant: Enhanced Production, Inc., Salt Lake City, UT (US)

(72) Inventor: Sidney J. Green, Salt Lake City, UT (US)

(73) Assignee: Enhanced Production, Inc., Salt Lake City, UT (US)

( * ) Notice: Subject to any disclaimer, the term of this patent is extended or adjusted under 35 U.S.C. 154(b) by 295 days.

(21) Appl. No.: 15/499,547

(22) Filed: Apr. 27, 2017

(65) Prior Publication Data

US 2017/0350224 A1  Dec. 7, 2017

Related U.S. Application Data

(60) Provisional application No. 62/345,654, filed on Jun. 3, 2016, provisional application No. 62/345,553, filed on Jun. 3, 2016, provisional application No. 62/345,627, filed on Jun. 3, 2016, provisional application No. 62/345,494, filed on Jun. 3, 2016, provisional application No. 62/345,590, filed on Jun. 3, 2016.

(51) Int. Cl.
*E21B 43/26* (2006.01)
*C09K 8/62* (2006.01)
*C09K 8/80* (2006.01)
*E21B 49/02* (2006.01)

(52) U.S. Cl.
CPC ............ *E21B 43/26* (2013.01); *C09K 8/62* (2013.01); *C09K 8/80* (2013.01); *E21B 49/02* (2013.01)

(58) Field of Classification Search
CPC .................................................... E21B 43/26
See application file for complete search history.

(56) References Cited

U.S. PATENT DOCUMENTS

| | | | |
|---|---|---|---|
| 2015/0083416 A1* | 3/2015 | Lant | E21B 43/16 166/279 |
| 2017/0211373 A1* | 7/2017 | McMurray | E21B 47/06 |
| 2017/0275970 A1* | 9/2017 | Crawford | G01V 99/005 |

* cited by examiner

*Primary Examiner* — Giovanna C Wright
(74) *Attorney, Agent, or Firm* — Thorpe, North & Western, LLP

(57) ABSTRACT

Well completion technology is disclosed for accounting for fracture surface roughness. A frack fluid is pumped into the wellbore to form a fracture in a formation surrounding a wellbore. In one example, a method for completing a wellbore comprises determining a fracture surface roughness for a given formation rock, and for a give fracture fluid or pumping schedule or both, prior to hydraulic fracturing. A fracture fluid and/or a pumping schedule is selected based on the determined fracture surface roughness and formation characteristics. The selected fracture fluid is pumped into the wellbore, with the selected pumping schedule, to create a desired fracture network in the formation.

18 Claims, 4 Drawing Sheets

HYDRAULIC FRACTURING IN HIGHLY HETEROGENEOUS FORMATIONS BY FLUID SELECTION BASED ON FRACTURE SURFACE ROUGHNESS

PRIORITY CLAIM

Priority is claimed to copending U.S. Provisional Patent Application Ser. Nos. 62/345,494; 62/345,553; 62/345,590; 62/345,627; and 62/345,654 filed Jun. 3, 2016, which are hereby incorporated herein by reference in their entirety.

TECHNICAL FIELD

Embodiments described herein relate generally to hydraulic fracturing and completing a wellbore.

BACKGROUND

Hydraulic fracturing (or "fracking") for oil and gas well production stimulation is very important and is a very large business. But fracking continues in many cases with a "brute force" approach that is extremely large scale, leading to poor economic returns and adverse environmental impacts. Additionally, the recovery factor for the unconventional tight shale formations rapidly being exploited in the US is low, and in many cases maybe only 10% of oil and 20% of natural gas is recovered.

BRIEF DESCRIPTION OF THE DRAWINGS

Invention features and advantages will be apparent from the detailed description which follows, taken in conjunction with the accompanying drawings, which together illustrate, by way of example, various invention embodiments; and, wherein.

Figure 1:
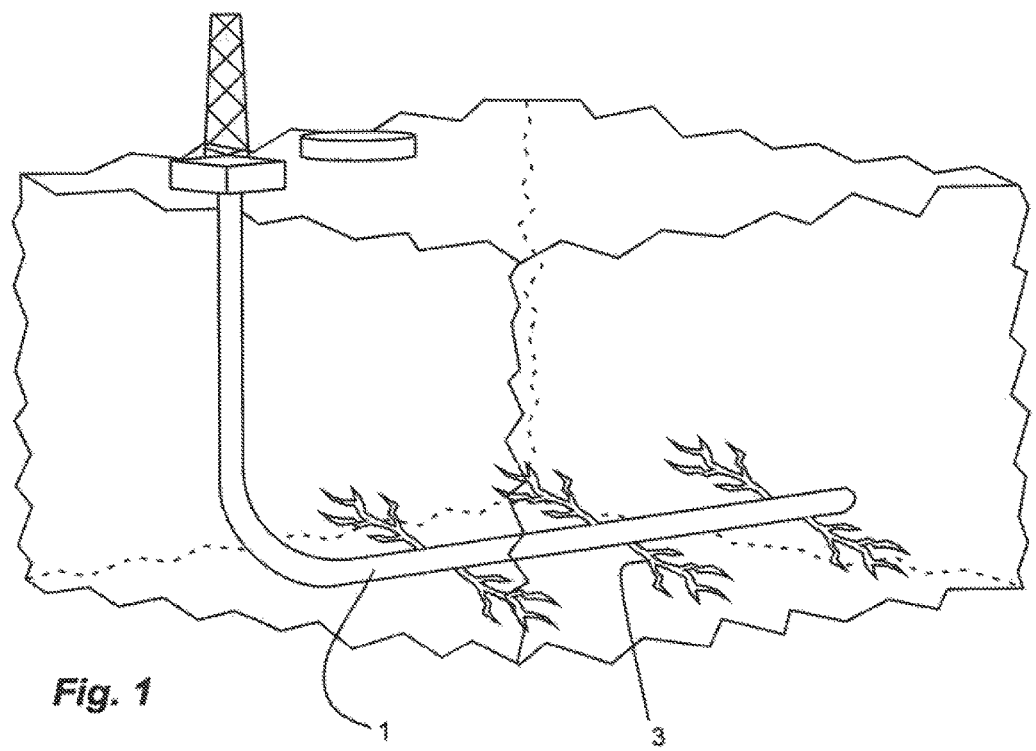
FIG. 1 is a cross-sectional perspective schematic view of a well with a vertical section that is turned to create a horizontal lateral portion of the well.

Reference will now be made to the exemplary embodiments illustrated, and specific language will be used herein to describe the same. It will nevertheless be understood that no limitation of the scope or to specific invention embodiments is thereby intended.

DESCRIPTION OF EMBODIMENTS

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possible be omitted and/or certain other steps not described herein may possible be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentration, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Furthermore, the describe features, structures, or characteristics may be combined in any suitable manner in one or more embodiments. In this description, numerous specific details are provided, such as example of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

The terms smooth and rough are used herein to refer to the surface roughness or anticipated surface roughness of the fracture. The term smooth can be defined as the fracture surface local variation of the order of less than 100 times the largest average particle size; while rough can be defined as greater than 100 times the largest average particle size. Particle size refers to the size of the makeup of the components of the rock or formation in which the fracture is formed, including mineral particles and organic particles. Fracture smoothness or roughness does not refer to fracture surface waviness on the scale of inches to feet, fracture step-overs of less than an inch to feet, fracture interception and propagation along planes of weakness, or the like. Smoothness or roughness refers to the small-scale rock fracture surface.

The terms frack fluid and fracture fluid are used interchangeably herein to refer to the fluid used for creating a fracture and/or the fluid in addition to a proppant added to the fluid. The frack fluid can have a viscosity, or the frack fluid with proppant or other additives can have an effective viscosity. Selecting a frack fluid based on the surface roughness or desired surface roughness of the fracture can comprise selecting the frack fluid itself based on the characteristics of the fracture fluid alone, or selecting the frack fluid based on the effective characteristics of the fracture fluid in combination with the proppant or other additives.

The terms micro-fracture and transverse micro-fracture are used interchangeably herein to refer to undesirable secondary micro-fractures or cracks in the inner surface of the fracture, and through which frack fluid can undesirably seep, leak, imbibe, etc. Such micro-fractures can be formed by the fracking process, i.e. the pumping of frack fluid into the fracture at high pressure. In addition, the transverse micro-fractures can be natural flaws or defects in the formation that are weak in shear and which enhance fracture breakdown in initiation. The pumping of the frack fluid into the fracture can exasperate the natural flaws or defects. The transverse micro-fractures can be characterized by a size less than a size of the fracture. Thus, the micro-fractures can have a size or aperture of less than 0.1 mm. The term "transverse" is used herein to refer to a direction of the micro-fracture across the fracture or inner face of the fracture. The transverse direction can be perpendicular to the fracture or inner face of the fracture, but can also be oriented at an oblique angle to the fracture or inner face of the fracture.

Example Embodiments

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

It has been recognized by the inventor that the fracking process is dynamic, with the fracture progressing with time, and the process is fluid flow and fracture coupled including rock-fluid interactions. Furthermore, the process is truly three-dimensional, which is difficult to project visually; and as for many three-dimensional processes, a two-dimensional representation may not at all visually depict the process. That is the case for hydraulic fracturing.

In addition, it has been recognized by the inventor that it would be advantageous to develop a method to account for fracture surface roughness in the fracture propagation process. In addition, it has been recognized by the inventor that the fracture surface roughness contributes to the development of the fracture, and that determining or even tailoring the surface fracture roughness can help develop a desired fracture network, such a complex fracture network, a fracture network that cuts across formation interfaces, or that is contained within the formation interfaces. In addition, it has been recognized by the inventor that it would be advantageous to develop a method to account for fluid-rock interaction, such as wetting or non-wetting between a fracture surface and the fracture fluid. Furthermore, it has been recognized by the inventor that it would be advantageous to develop a method to create a desired facture network and a desired fracture surface roughness.

A method for completing a wellbore and/or for propagating a hydraulic fracture comprises determining a fracture surface roughness for a given formation rock, and for a give fracture fluid or pumping schedule or both, prior to hydraulic fracturing. In one aspect, the give formation can comprise heterogeneous shale. A fracture fluid and/or a pumping schedule is selected based on the determined fracture surface roughness and formation characteristics. The selected fracture fluid is pumped into the wellbore, with the selected pumping schedule, to create a desired fracture network in the formation.

In one aspect, the fracture surface roughness can be determined by obtaining a core sample with formation characteristics of the give formation rock. A fluid fracturing test and/or a mechanical wedging fracture test can be conducted on the core sample. Thus, the surface roughness of the core sample can be observed and measured to determine a probable fracture surface roughness of the hydraulic fracture. In addition, the fracture fluid and/or pumping schedule can be taken into consideration with respect to the observed and/or measured surface roughness of the core sample to determine the probable fracture surface roughness of the hydraulic fracture.

The Process of Hydraulic Fracturing in Tight Shales

Fluid driven fractures in non-homogeneous non-continuum complicated rock formations such as the "tight shales", under high compressive stresses as exists deep in the earth, is a complex process. It is a process that has attracted many researchers to make calculations of ideal materials in an attempt to simulate the process. And it is a process that has caused practitioners to proceed in a trial-and-error manner to drill and complete and produce oil and gas without truly understanding the process. Organic-rich mudstones (the so called "tight shales" or "black shales") are heterogeneous at all scales. These tight shales are composed of hard strong sub-micron size mineral particles, clay platelets, organic matter, and micro to nano meter scale pores filled with different fluids including water, methane, and hydrocarbon liquids.

Furthermore, the tight shales also contain discontinuities—often called "planes of weakness"—consisting of layer or bedding interfaces, natural and usually tightly filled fractures, thin interfaces or zones of different materials, and high-strength inclusions. Interface makeup and mechanical properties variations between the shale units can result in these interfaces being weak in shear strength. Such interfaces can drastically affect hydraulic fracture formation.

Based on the known tight shale make-up, it is not reasonable to believe that hydraulic fracture occurs as for a homogeneous continuum elastic-brittle material. In practice the hydraulic fracture is more complicated. How the fracture emanates from the wellbore is not clear, but generally it is assumed that a single fracture propagates from each perforation cluster, notched interval, or sliding sleeve opening, and growth tends to be at least somewhat centered around the wellbore. The fracture can be complicated and may be somewhat elliptical in shape not necessarily symmetrical about the well bore. For the tight shales there will be branching and step-over's leading to a complex fracture network. Furthermore, it is not uncommon for the fracture to reach an interface and turn and propagate within the interface for some short distance, or even for long distances.

At some time proppant (most often sand but sometimes ceramics or other materials) is added to be carried with the fracture fluid and ultimately left in the fracture to prop open the fracture after pumping stops. In detail, the process is complicated and involves practice that has been developed over time by industry drilling tens of thousands of tight shale wells.

Fluid Driven Fractures

The process of a fluid driven fracture in tight shales deep in the earth may be visualized as the following. For homogeneous continuous rock (considering an ideal situation), as more fracture fluid is injected into an already existing fracture, the fracture fluid "pries" the fracture further open by the fracture fluid pressure increase. Stresses change in the rock all around the fracture and particularly in the region of the fracture tip. These stress adjustments travel with the speed of sound in the rock, several thousand feet per second—exceedingly fast, almost instantaneously for the process here. For an elastic-brittle substance (which may be more like granite rock, but not the shales) shear and tensile stresses would build in the region very near the crack tip. When a certain stress intensity is reached in this very small region near the crack tip, fracture propagation—extension— occurs.

The crack propagation speed is not well known; some estimate about half the speed of sound in geo materials. The Rayleigh wave speed would be an upper bound, about two-thirds the speed of sound for ideal rock. The fracture fluid will start to move with the crack growth, but cannot keep up with such high crack growth speed. At best the fluid velocity could begin to move at the speed of sound in the fracture fluid, as the fluid effectively decompressed in the fracture. Without the fluid keeping up with the crack growth, the crack eventually stops growing. The fluid catches up, wedging opening the fracture; the crack eventually grows again; and so forth. A step process would occur.

For the shales (which are not a homogeneous continuous material), the above fracture propagation model is not completely the case. As fluid is injected into an already existing fracture and fracture fluid pressure increases, and stress adjustments do occur with the speed of sound in the shale.

And, stresses near the crack tip increase, leading to rock damage in a region near the crack tip until failure occurs and the crack advances. The region around the crack tip is complicated and will affect the fracture growth speed.

Fracture Fluid Velocities During Fracture Propagation

Figure 8:
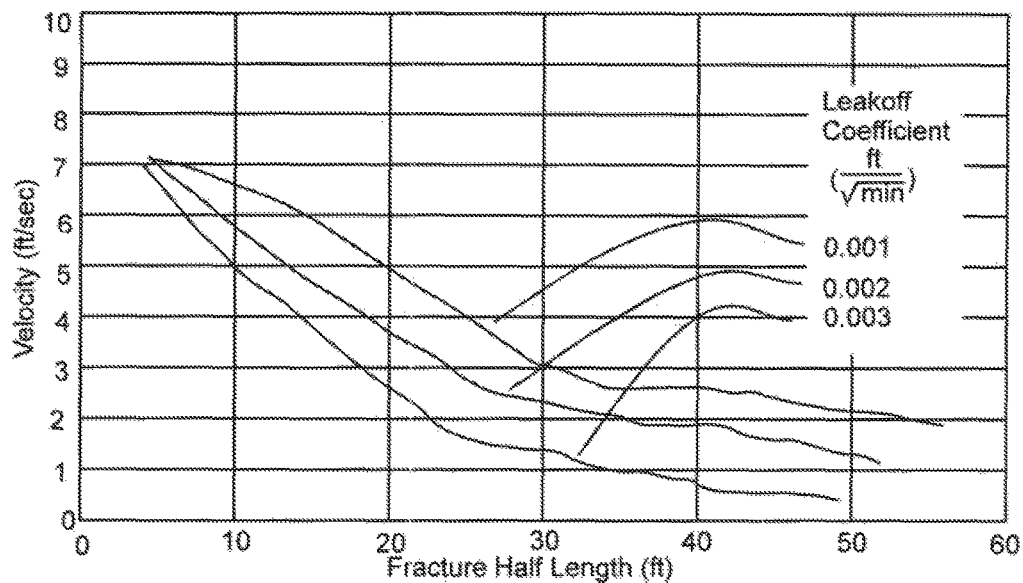
FIG. 8 is graph showing fluid velocities in feet per second versus distance from the wellbore for different leak-off conditions for a shale with intermediate stiffness and estimated in situ stresses.

Based on a conservation of mass, the fracture fluid velocity in the narrow fracture can be estimated as the fracture length grows away from the wellbore. The fracture width and the leak-off into the surrounding formation can be estimated. FIG. 8 shows fluid velocities in feet per second for different leak-off conditions for a shale with intermediate stiffness and estimated in-situ stresses. The injection rate is 12 barrels per minute continuous at the wellbore of slick water as the fracture fluid. The estimated fracture widths are taken from a quasi-three dimensional planar fracture calculation with no height containment (approximately circular fracture). Three different leak-offs are shown, with the top line no leak-off, the bottom line leaking off about 50 percent by time the fracture has grown 50 feet from the wellbore, and the middle line is an intermediate leak-off of about 25 percent. The fracture is taken as symmetrical around the wellbore; the "half length" is the distance of the fracture tip from the wellbore.

Fracture fluid velocities beginning a few feet away from the wellbore (not right at the wellbore) range from about 10 feet per second declining to about 1 foot per second at about 50 feet from the wellbore for a leak-off of nearly fifty percent by time the fracture has reached 50 feet from the wellbore (the bottom line). If non-homogeneous fingering would occur (instead of homogeneous circular growth), it is estimated that the fluid velocity in the "finger" fracture extension would have to be upwards of one hundred times the fluid velocity for the homogeneous expanding circular fracture. The primary slowing of the fracture fluid velocities for a given injection rate and a given fluid is due to dispersion (increasing diameter of the fracture), and secondly to fluid leak-off. Fracture width variation is a small effect. High fracture fluid velocities would lead to large pressure drops required to move different fluids through the narrow fractures. These pressure drops along the fracture for the high fluid velocities contribute to the complex fracture formation.

Fracture Fluid Pressure Drop along the Fracture

Figure 9:
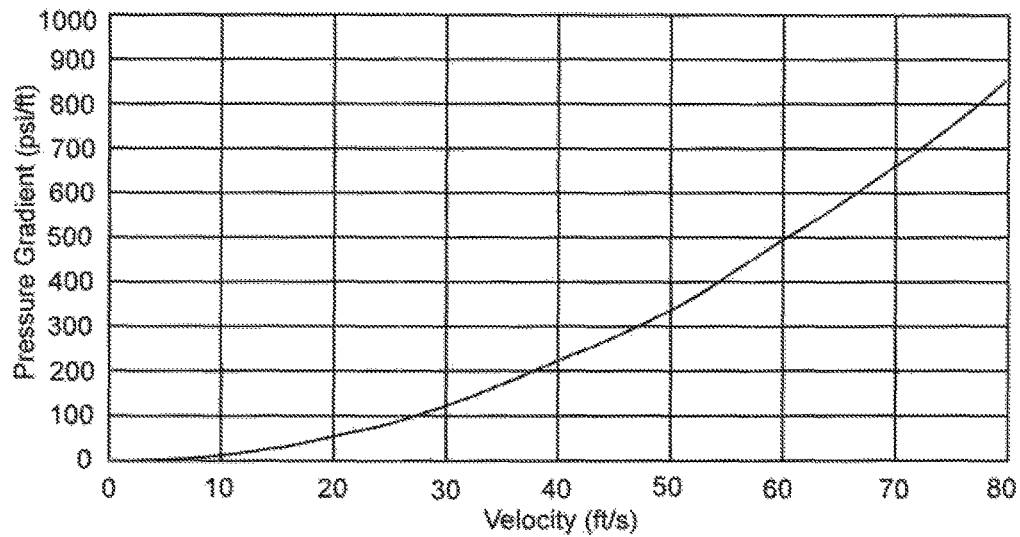
FIG. 9 is a graph showing the pressure drop versus the fluid velocity based on a calculation for water flowing in a 1 mm height channel with wall roughness estimated as sinusoidal irregularities with height of ten percent of the channel thickness.

Calculations show fracture fluid pressure drop as the fluid is flowing in a narrow channel at high velocities. FIG. 9 shows the pressure drop versus the fluid velocity. This calculation is for water flowing in a 1 mm height channel with wall roughness estimated as sinusoidal irregularities with height of ten percent of the channel thickness. For this case, pressure drop at 1 foot per second fluid velocity is about 15 psi per foot, while at 10 feet per second velocity pressure drop is about 340 psi per foot. And, at 100 feet per second velocity the pressure drop is about 1300 psi per foot. These pressure drops per foot would lower the net pressure in the fracture (the difference between the fracture fluid pressure and the rock pore pressure) significantly along the fracture length, particularly near the fracture tip even for slick water. Considering that a net pressures as low as 50 psi has been claimed to cause a fracture to extend in the shales, the pressure drops per foot shown above are large.

The fracture surface roughness can be an important factor. Different shales show different fracture surface roughness—some relatively smooth and some much rougher (as defined above). Also, the fluid properties of viscosity and shale wetting or non-wetting can be key parameters, and have yet to be considered in the calculations. The basis for these calculations notes that the flow resistance will increase as the cube of the channel height decreases. Thus, as the fracture width decreases large pressure drops occur. The Reynolds number can be critical, and an increase in the pressure gradient versus velocity tends to occur at about 10 feet per second (for water) where the Reynolds number is a few thousand. The pressure drop along the fracture should be considered.

Fracture Fluid Selection Based on Fracture Face Roughness

Fluid flow at high velocities in the narrow fracture is significantly affected by the fracture face surface roughness. The addition of proppant materials in the fluid amplifies the surface roughness affects, as well as the fluid-rock interaction; i.e. for example wetting or non-wetting fluids. Selecting the fracture fluid, or pumping schedule, or both, based on the fracture surface roughness and formation characteristics, and/or the fluid-rock interaction, can: result in a lower or a higher pressure drop along the fracture, as desired, to create a more productive fracture network within a petrophysical sweet spot of the given formation rock; favorably alter interaction of the fracture propagation with a discontinuity; change the complicity or simplicity of the fracture network; change proppant transport through the fracture; cause or minimize proppant screen-out; and/or increase fracture length.

A method for completing a wellbore and/or for propagating a hydraulic fracture comprises determining a fracture surface roughness for a given formation rock, and for a given fracture fluid or pumping schedule or both, prior to hydraulic fracturing. In one aspect, the give formation can comprise heterogeneous shale. In another aspect, a desired fracture surface roughness can be obtained to create the desired facture network.

As described above, the terms smooth and rough are used herein to refer to the surface roughness or anticipated surface roughness of the fracture or face or surface of the fracture. The term smooth can be defined as the fracture surface local variation of the order of less than 100 times the largest average particle size; while rough can be defined as greater than 100 times the largest average particle size. Particle size refers to the size of the makeup of the components of the rock or formation in which the fracture is formed, including mineral particles and organic particles. Fracture smoothness or roughness does not refer to fracture surface waviness on the scale of inches to feet, fracture step-overs of less than an inch to feet, fracture interception and propagation along planes of weakness, or the like. Smoothness or roughness refers to the small-scale rock fracture surface.

In one aspect, the fracture surface roughness can be determined by obtaining a core sample with formation characteristics of the given formation rock. A fluid fracturing test and/or a mechanical wedging fracture test can be conducted on the core sample. Thus, the surface roughness of the core sample can be observed and measured to determine a probable fracture surface roughness of the hydraulic fracture. In another aspect, the fracture surface roughness can be determined by obtaining an analog rock or that has already been measured as to its fracture surface roughness. In addition, the fracture fluid and/or pumping schedule can be taken into consideration with respect to the observed and/or measured surface roughness of the core sample to determine the probable fracture surface roughness of the hydraulic fracture.

The method also comprises selecting a fracture fluid and/or a pumping schedule based on the determined and/or desired fracture surface roughness and formation characteristics. The selected fracture fluid is pumped into the wellbore, with the selected pumping schedule, to create a desired fracture network in the formation. In one aspect, the fracture fluid selected can also comprise selecting additives, such as proppants. In another aspect, selecting the fracture fluid can comprise selecting a viscosity of the fracture fluid, or an effective viscosity of the fracture fluid and additives, based on the fracture surface roughness. In one aspect, it is believed that a lower viscosity or effective viscosity fracture fluid may result in a smoother fracture surface roughness. In another aspect, the pumping schedule can comprise the pumping rate.

In some situations is can be desirable to have a smooth fracture surface roughness; such as to propagate a fracture network that cuts across formation interfaces to achieve a greater fracture height in the formation. In one aspect, the fracture fluid and/or the pumping schedule can be selected to obtain a smooth fracture surface roughness at a closer distance from the wellbore less than 20 feet. In another aspect, the fracture fluid and/or the pumping schedule can be selected to obtain a smooth fracture surface roughness at a further distance from the wellbore greater than 20 feet in order to obtain a fracture network that cuts across formation interfaces to achieve a greater fracture height. In some situations it can be desirable to have a rough fracture surface roughness; such as to propagate a fracture network that is contained in the formation, and that does not cut across formation interfaces. In another aspect, the fracture fluid and/or the pumping schedule can be selected to obtain a rough fracture surface roughness at a further distance from the wellbore greater than 20 feet to obtain a fracture network that is contained and does not cut across formation interfaces to achieve a greater fracture height containment.

As described above, in one aspect, the fracture fluid and/or the pumping schedule can be selected based on the given formation rock, and given in-situ stresses in the formation, to obtain a desired fracture surface roughness to create the desired facture network. In one aspect, it is believed that the fracture fluid and/or the pumping schedule can be selected to make the formation fail in extension, rather than tension, to obtain a smoother fracture surface roughness.

Also as described above, the selected fracture fluid and/or the selected pumping schedule based on the fracture surface roughness can: result in a lower or a higher pressure drop along the fracture, as desired, to create a more productive fracture network within a petrophysical sweet spot of the given formation rock; favorably alter interaction of the fracture propagation with a discontinuity; change the complexity or simplicity of the fracture network; change proppant transport through the fracture; cause or minimize proppant screen-out; and/or increase fracture length.

In addition, the method can further comprise determining a fluid-rock interaction. In one aspect, the fluid-rock interaction can comprise wetting or non-wetting between a fracture surface and the fracture fluid. Determining the fluid-rock interaction can comprises obtaining a core sample with formation characteristics of the given formation rock, and conducting a fluid wettability test on the core sample. The fracture fluid can be selected based on the fluid-rock interaction.

As described above, the selected fracture fluid based on the fluid-rock interaction can result in a lower or a higher pressure drop along the fracture, as desired, to create a more productive fracture network within a petrophysical sweet spot of the given formation rock; favorably alter interaction of the fracture propagation with a discontinuity; change the complexity or simplicity of the fracture network; change proppant transport through the fracture; cause or minimize proppant screen-out; and/or increases fracture length.

Furthermore, the method can comprise determining a desired fracture surface roughness for a given formation rock prior to hydraulic fracturing. A fracture fluid and/or a pumping schedule can be selected based on the desired fracture surface roughness for the given formation rock and anticipated stresses in the formation. The fracture fluid can be pumped into the wellbore to create a desired fracture network with substantially the desired surface roughness.

Hydraulic Fracture "Parts"

Figure 2:
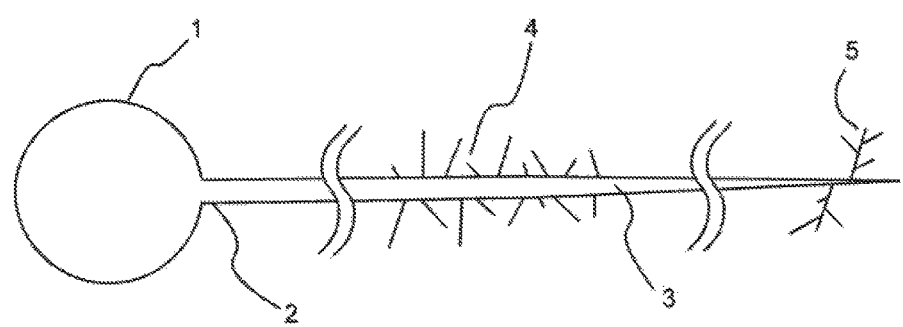
FIG. 2 is a cross-sectional side schematic view of a horizontal well and a hydraulic fracture with its "parts."

The "Parts" of the hydraulic fracture are shown schematically in FIG. 2. The wellbore 1 can extend vertically only, or can also extend horizontally. A "connector" 2 extends out a first few feet to approximately ten feet from the wellbore 1. The connector 2 can be affected by stress shadowing from other fractures. A propped fracture 3 can extend approximately fifty feet to approximately one to two hundred feet in distance from the connector 2. The propped fracture 3 can account for nearly all of the well production. The transverse micro-fractures 4 can extend transverse (perpendicular and/or obtuse) to the fracture 3. The transverse micro-fractures 4 can extend a few inches to a few feet in length, and are mostly un-propped. These transverse micro-fractures 4 tend to provide a high effective leak-off of the fracture fluid during fracturing, e.g. as high as 50% of the fracture fluid injected in one aspect, up to 40% of the fracture fluid injected in another aspect, and up to 30% of the fracture fluid injected in another aspect. A far-field area 5 can have substantially un-propped fractures, and generally provides little or no production.

A partitioning of the fracture fluid is possible—that is, calculating and/or estimating where the fracture fluid goes. It is estimated that 5-8% may imbibe into the tight shale rock during pumping of a stage (over about an hour and a half pumping); 18-20% may be surrounding the proppant in the propped fracture region 3; 50% or more may be estimated to be in the transverse micro-fractures 4; thus leaving about 20-25% that will be in the far-field un-propped fractures 5. These are estimates, and will vary depending on the tight shale, the fracture fluid, the in-situ stresses, and the overall fracture design.

Sealing of the Transverse Micro-Fractures

A large part of the fracture fluid, up to 50% or more, is in the transverse micro-fractures 4. Resisting this fluid loss, by resisting the formation of transverse micro-fractures and/or sealing existing and/or newly formed transverse micro-fractures, can have a drastic impact on the fracture propagation by: reducing the fracture fluid required; changing the fracture from more complex to simpler; having a large effect on the proppant transport; providing different propped fractures; and/or allowing fracture control to improve reservoir contact.

Virtual Model of Fluid Driven Fracture Propagation in Complex Shales Under High Compressive Stresses Certainly fluid driven fractures in non-homogeneous, non-continuum, complicated shales under high compressive stresses is a complex process. It is a process that has attracted many researchers to make calculations of ideal materials in an attempt to simulate the process. And it is a process that has caused many practitioners to throw up their hands in frustration and proceed with a full understanding that they do not understand the process in detail.

The belief is that if one has the correct mental picture of the process, then modeling this process as is possible can lead to optimization. The many "ideal" calculations and the few calculations considering complicated effects such as non-elastic rock behavior, coupled fluid flow and fracture, and the like are indeed most helpful and clearly guide the development of the virtual model. Likewise, the vase number of hydraulic fracturing well stimulations underway in the complicated tight shales—as well as the million or so hydraulic fractures performed in many formations over the past nearly seventy years—are the basis for any proof tests of any thought processes or models. In between, are a number of laboratory tests on small scale and large scale samples of simulation materials and shales that provide correlations and calibrations of features of different processes and some models.

Even with this vast background of simplified calculations, laboratory tests, and field experience, it is correct to say that hydraulic fracturing of the shales for oil and gas production stimulation is not well understood. After all, it is not possible to actually "see" the process. Nevertheless, the industry has been incredibly successful relying on a process of drilling, fracturing, and production to calibrate out to a large extent the details of the rock properties and the in situ stresses.

What is presented here are the ingredients to form virtual model that is a better mental picture. The research focuses on the role of the fracturing fluid, and how to optimize the fracturing fluid and the pumping.

Importance of the Rock

Many agree that the missing link to understanding hydraulic fracturing is the lack of understanding of the reservoir rock. Organic-rich mudstones (the so called "tight shales" or "black shales") are heterogeneous at all scales, and on the micro scale are non-continuous.

These rocks are composed of hard strong sub-micron size mineral particles, clay platelets, organic matter, and micro to nano meter scale pores filled with different fluids including water, methane, and hydrocarbon liquids. The mudstones may range from calcareous to argillaceous with detrital quartz and other particles, high clay content ranging to 20% or more. Pyrite is common with bitumen vitrinite sometimes present. Volcanic layering may be present as well as calcite veins. Total organic content may range from a few percent to 10% by eight (about double by volume). Total porosities range from a few percent to 6-8%. The organic content may be widely dispersed or in abundant clumps, and may be surrounding mineral particles or filing gaps around mineral particles.

It is impossible to imagine that a substance composed of hard strong mineral grains, clay platelets, organic matter, pores filled with fluids ranging from gases to liquids would behave as a homogeneous continuum elastic material. They do not. When one considers failure it can be important to realize that at some scale the substance "comes apart"—it breaks. In the "coming apart process", because of the high far-field compressive stresses environment, shearing may be more easily visualized rather than tensile failure. We may visualize absolute tensile failure occurring just at the fracture tip as the fracture fluid "pries" open the rock to "come apart", but the process may be more shearing and extension type failure. One can also visualize shearing and possible compaction, and micro pore fluid and pore pressure adjustments occurring just past the actual crack tip before the rock finally "comes apart". And, it is very plausible to visualize a time dependence for the "coming apart", a failure process that may be due to thermally activated processes such as stress corrosion or chemo-mechanical processes, or due to fluid movements and pore pressure adjustments. The latter should certainly be happening and will require some time to occur.

The shales also contain discontinuities—often called "planes of weakness"—consisting of layer or bedding interfaces, natural and usually tightly filled fractures, thin interfaces or zones of different materials, and high-strength inclusions. The layering may be associated with the depositional environment, but the properties change over time due to non-homogeneous digenesis transformations. This leads to both vertical and horizontal variations. Interface makeup and mechanical properties variations between the shale units can result in these weak interfaces (shear strength wise). Often layering or bedding interfaces may be approximately horizontal and align approximately with the principal directions of the in situ stresses. Other times the rock principal material properties directions may not align at all with the principal stress directions.

Bulk unconfined strength may vary from 10,000 psi to 35,000 psi; and variations in Young's Modulus range from 1 million psi to 5 million psi. These bulk properties can change over small intervals that vary from inches to feet. An apparent fracture toughness—a quantity ill-defined for the shales with no precise method of measuring under high compressive stresses—tends to give fracture pressures in the range of 18,000 psi to 24,000 psi. This is based on thick walled cylinder confined pressure measurements (the standard to infer fracture toughness of rocks). This is a surprisingly small range for a variety of shales, even though the shales show large variations in their makeup and their strength and stiffness. This is possibly due to the in-precise technique for the inferred fracture toughness; nevertheless, this is the state-of-the-art.

Based on the known shale make-up, it is not reasonable to believe that shale fracture occurs as for a homogeneous continuum elastic-brittle material. This has to be taken into account in considering the numerous calculations that do treat the shale as a homogeneous continuum, whether taken as elastic brittle or some non-linear representation.

Hydraulic Fracturing—The Process

A well can have a vertical section that is turned to create a horizontal lateral portion of the well. The vertical section may be of the order of one to two miles deep, and the horizontal lateral may be from over a half mile to about two miles in horizontal length. Fluid is pumped at high pressure into the lateral section to create fractures.

In practice the hydraulic fracture complicated. How the fracture emanates from the wellbore is not clear, but generally it is assumed that a single fracture propagates from each perforation cluster, notched interval, or sliding sleeve opening, and growth tends to be at least somewhat centered around the wellbore. The fracture may be somewhat elliptical in shape not necessarily symmetrical about the well bore. For the shales these will be branching and step-over's leading to a complex fracture network. Furthermore, it is not uncommon for the fracture to reach a layer interface and turn and propagate horizontally within the layer interface for some distance, or even for long distances. Fracture width in the 'main' fracture area may be about 0.2 inches (maybe twice to three times that width just at the wellbore) and decreasing somewhat with fracture length depending on the shale stiffness and other properties, in situ stresses, the pumping rate, and the fracture fluid.

During hydraulic fracturing the fluid pressure is increased until rock failure occurs, with the highest pressure referred to as "breakdown", when a micro fracture occurs. Pumping of clear fluid (the pad, no proppant yet added) typically is first done and the new fracture is created.

At some time proppant (most often sand but sometimes ceramics or other materials) is added to be carried with the fracture fluid and ultimately left in the fracture to prop open the fracture after pumping stops. Pumping a stage may require an hour and a half; some fracture fluid will be "squeezed" from the fracture and returned to the surface as "flowback" after pumping stops—but typically not immediately, maybe days or weeks after. In detail, the process is complicated and involves much art and practice that has been developed over time by industry drilling tens of thousands of shale wells.

In considering hydraulic fracturing it is helpful to consider the "parts" of the hydraulic fracture as shown in FIG. 1 (in which "half" of the fracture is shown schematically): 1) there is the breakdown involving the wellbore conditions, the fracture fluid, the rock, in situ stresses, and other factors; 2) there is the near wellbore fracture, sometimes called the "connector" 2, extending out the first few feet to maybe ten feet from the wellbore (this part is clearly affected by stress shadowing from other fractures); 3) there is the propped fracture 3 extending fifty to maybe one or two hundred feet in distance from the connector, which accounts for nearly all of the well production; 4) there is the transverse micro-fractures 4 abutting and at high angle to the principal fracture (likely these fractures are a few inches to a few feet in length and are mostly un-propped, but tend to provide a high effective leak-off of the fracture fluid during fracturing, maybe as high as 50% of the fracture fluid injected); and 5) there is the far-field primarily un-propped fractures 5, that generally provide no or little production.

In considering hydraulic fracturing it is helpful to partition the fracture fluid—that is, where does the fracture fluid go. It is estimated that 5-8% may imbibe into the rock during pumping of a stage (over about an hour and a half); 18-20% may be surrounding the proppant in the propped fracture region 3; 50% may be estimated to be in the transverse micro-fractures 4; this leaving about 25% in the far-field un-propped fractures 5. These of coarse are estimates, and will vary depending on the shale, the fracture fluid, the in situ stresses, and the overall fracture design.

This invention focuses on the fracture propagation of the propped fracture area 3 and 4. Emphasis is on how the fluid driven fracture propagates once breakdown and fracture initiation has occurred at the wellbore. It is this fracture network that will ultimately provide the fluid conducive paths for the drainage of the fluids from the reservoir to the wellbore for production. The work further focuses on how the fracture fluid and pumping affects this fracture propagation, with the intent of favorably manipulating the fracture propagation.

Although the invention here focuses on the fracturing fluid and pumping, it is worth noting that the fracture fluid must do three things—create the fracture, carry the proppant, and leave a connected, conductive propped fracture. The invention here focuses on the first with the aim of optimizing fracture fluids for hydraulic fracture creation. Indeed, if the proper fracture network in contact with the reservoir is not created, there is no hope of achieving high productivity no matter how well the other two functions are achieved. It is noted that the role of the fracturing fluid on the creation of the fracture has generally not been considered discretely beyond the fluid's viscosity and the pumping rate.

Hydraulic Fracture Propagation "Main Drivers"

First Principles: Hydraulic fracture propagation in complex shale formations under high compressive stresses is complicated. It is an un-calculateable problem in detail; basic parameters are unknown; and no one can actually see in detail where the fracture goes in order to validate any analysis. Thus, in order to optimize this most important process for the recovery of oil and gas (and although not discussed here, as a foundation for improved enhanced geothermal energy recovery), it is appropriate to break hydraulic fracturing into "main drivers", and to understand each such driver considering "first principles". Previous numerous calculations and modeling that include approximations and assumptions can then be used to better correlate with field observations and to guide optimization. Following this concept, hydraulic fracturing is considered here requiring a consistency with each "main driver" of the process following "first principles". The fracture propagation "main drivers" to be considered are as noted below:

1. The rock is not homogeneous and continuous. It is made up of hard strong submicron size mineral particles, clay platelets, organic matter, micro to nano meter scale porosity, and different fluids in the pores, invariably including water, gas (mostly methane), and hydrocarbon liquids.

2. The rock has many discontinuities such as lithology change interfaces, natural filled fractures, and inclusions. Many of these discontinuities are planes of weakness in terms of shear strength and tensile strength. This rock fabric exists at the macro scale of feet and down to the micro scale of microns.

3. The fracture fluid and the proppant must "go somewhere". They occupy space, and conservation of mass analysis can be very helpful to understand fracture propagation.

4. The pumping (injection) rate, pumping pressure, and the fluid injected are knowns. Nothing else is precisely known.

5. Microseismic measurements (and sometimes surface Tiltmeter measurements), production data, reservoir drawdown pressure are commonly available to help to estimate hydraulic fracture locations. Some borehole temperature and vibrations (sometimes measured in the laterals during hydraulic fracturing and/or production) and the use of tracer fluids or tracer proppants also can help to locate hydraulic fractures. Electromagnetic measurements and cross-well tomography are being researched as added methods to detect hydraulic fractures and proppant location. Adjacent bore holes may also assist to identify hydraulic fractures, as well as production logging to infer zonal production locations along the lateral.

6. In considering "first principles" it should be remembered that the shale is not well characterized to the level of the fracture propagation, in situ stresses tend to at best be known only in general direction and global magnitude, and pore pressure tends to be inferred indirectly over time as a play is developed.

Figure 3:
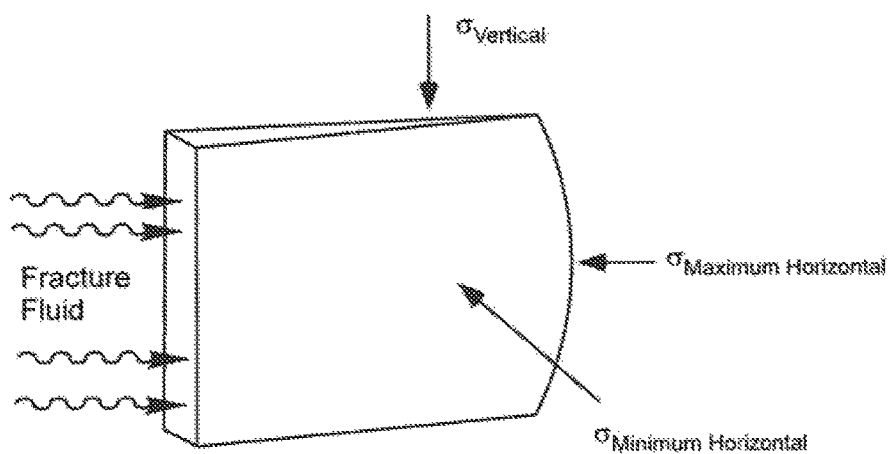
FIG. 3 is a schematic perspective view of a showing a crack tip demonstrating a micro process.

Fluid Driven Fracture Propagation: Fracture propagation—crack growth—is a macro process considering the huge injection of high pressure fluids, of the order of 15 barrels per minute for a single fracture network (i.e. pumping at 70-80 barrels per minute per stage with 5 clusters within a stage that may each yield one fracture network). However, at the crack tip the extension becomes a very micro process. The rock has to part, starting at the submicron scale. It is this crack tip process that controls the macro process of driving the network via injecting huge volumes of fluid at high rates. FIG. 3 is an illustration showing the macro process—the crack tip micro process. Ideally the crack extends in the direction of the maximum horizontal stress, allowing the crack to open in the direction of the minimum horizontal stress. This is of course ideal, assuming that the vertical in situ stress is the greatest stress, and that the in situ principal stress directions align with the crack principal directions. And of course, the in situ stress principal directions may or may not align with the rock material property principal directions. Fracturing is a competition between stresses and the rock properties.

The process may be visualized as the following. For homogeneous continuous rock (considering an ideal situation), as more fracture fluid is injected into an already existing fracture, the fracture dual "pries" the fracture further open by the fracture fluid pressure increase. Stresses change in the rock all around the fracture and particularly in the region of the fracture tip. These stress adjustments travel with the speed of sound in the rock, several thousand feet per second—exceedingly fast, almost instantaneously for the process here. For an elastic-brittle substance (maybe more like granite rock, but not the shales) shear and tensile stresses would build in the region very near the crack tip. When a certain stress intensity is reached in this very small region near the crack tip, fracture propagation—extension—occurs. (Conventional analysis most often would use an energy criteria allowing the fracture to grow for a given energy input, with growth continuing until the energy required to create the new fracture surface area equals the energy input.)

The crack propagation speed isn't well known; some estimate about half the speed of sound in geo materials. The Rayleigh wave speed would be an upper bound, about two-thirds the speed of sound for ideal rock. The fracture fluid will start to move with the crack growth, but cannot keep up with such high crack growth speed. At best the fluid velocity could begin to move at the speed of sound in the fracture fluid, as the fluid effectively decompressed in the fracture. Without the fluid keeping up with the crack growth, the crack eventually stops growing. The fluid catches up, wedging opening the fracture; the crack eventually grows again; and so forth. A step process would seem to occur. (Later discussion will occur regarding the expected step lengths and what might change the propagation from step wise to continuous growth.)

For the shales (which are not a homogeneous continues material), the above fracture propagation model is not completely the case. As fluid is injected into an already existing fracture and fracture fluid pressure increases, and stress adjustments do occur with the speed of sound in the shale. And, stresses near the crack tip increase, and lead to shale damage in a region near the crack tip. The behavior will not be just elastic-brittle behavior. This creates a three dimensional "process zone" around the crack tip (which may be somewhat analogous to a "cohesive zone" sometimes referred to in the literature). The process zone size, shape, and the damage are not well known; this process zone is discussed below.

Figure 4:
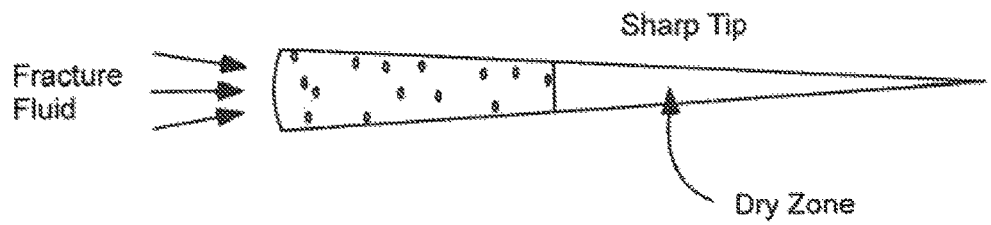
FIG. 4 is a schematic view of a very blunted crack tip creating a larger fracture width towards the crack tip.
Figure 5:
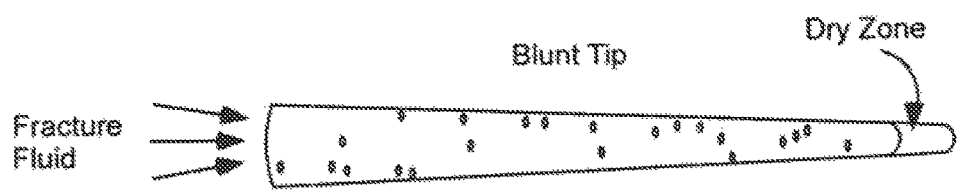
FIG. 5 is a schematic view of a very pointed crack tip creating a narrow fracture width toward the crack tip.

Crack Tip Details: What happens at the crack tip can be important. FIGS. 4 and 5 suggests two possibilities for the crack tip configuration. One (FIG. 4) is a very blunted crack tip creating a larger fracture width toward the crack tip. The other (FIG. 5) suggests a very pointed crack tip and a narrow fracture width toward the crack tip. Unfortunately, the crack tip configuration is not well known as it is not possible to visualize the crack tip as the crack is growing under conditions of high compressive stresses. Different shales may exhibit different crack tip shapes due to the shale make-up. Speculation here is toward the pointed, sharp crack tip for most shales.

For the sharp crack tip (and likely even for a blunted crack tip), it is certain that there will be a dry zone near the crack tip. That is, there will be a region where fracture fluid cannot ever reach. As the fracture propagates, a near absolute vacuum momentarily occurs as the crack grows, to first be filled by vaporization of shale fluids and fracture fluid.

The potential of a dry zone near the fracture tip is not new, and has been considered in a few fracture calculations. It has been measured/observed to some extent in laboratory tests. An exception may be for a fracture fluid that would wet the rock and be mobilized by capillary pressures, or for gaseous fracture fluids or fluids that can be vaporized at low pressures such as $CO_2$ that could rapidly expand from supercritical to gas. Shales that would produce a 'wider' fracture near the tip (the "blunt tip" illustrated in FIG. 5) would undoubtedly show at least somewhat different fracture propagation than a shale with a more pointed, sharp crack tip.

The implications of a dry zone can be important. Overall, it seems likely that fracture fluid, and certainly not proppant, will never reach the crack tip during the hydraulic fracturing process, other than for the exceptions as noted above. "Tip screen-out" does not mean that proppant actually reaches the crack tip. It means that proppant has compacted and bridged in the fracture and will not move, possibly in the vicinity of the fracture tip, but not at the crack tip.

Crack Tip Process Zone: The shales are not homogeneous continuum materials at the micro scale. Confocal microscope images of a shale show the laminations even at the micro scale. The region of stress intensity near the crack tip will be affected by this shale micro complexity.

Unfortunately, only limited observations of the crack tip process zone are available, and any such images that are available are after the crack has grown and the sample has been unloaded. (Some attempts have been made to capture the shale crack tip structure before the sample is unloaded by using injected epoxy or a liquid metal that will solidify before unloading.) The limited observations suggest that slip has occurred along the micro laminations. That is, the deformation in the crack tip stress intensity process zone has occurred by shear slip. Such slip along micro planes of weakness would lead to the shale constituents relocating that could either cause compaction or dilation in the process zone. With respect to any dilation, clearly micro cracks are not expected to be created in this zone due to the high compressive far-field stresses. A micro crack would cause the shale to compress outward from the zone as the shale always "has to go somewhere". In fact, it would seem more likely that the region near the crack tip may compact. Whether compaction or dilation occurs, the pore fluids would rearrange and local pore pressure would change.

Figure 6:
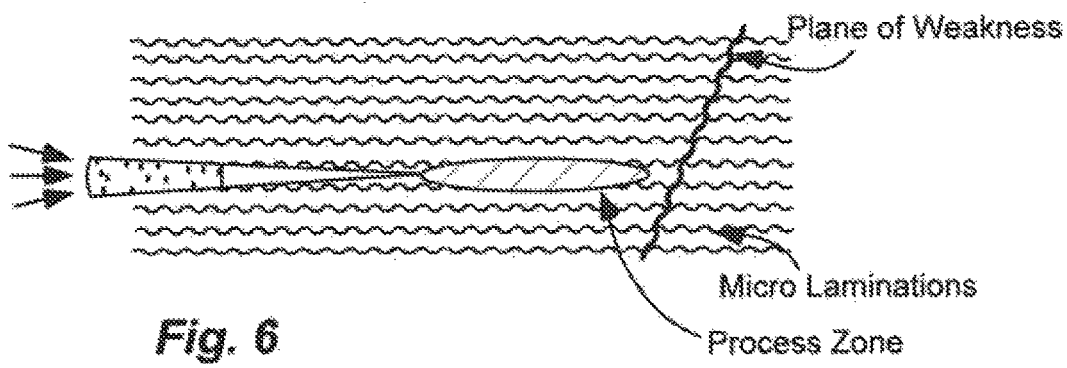
FIG. 6 is a schematic view of a process zone stress intensity profile with a fracture growing vertically across the laminations.
Figure 7:
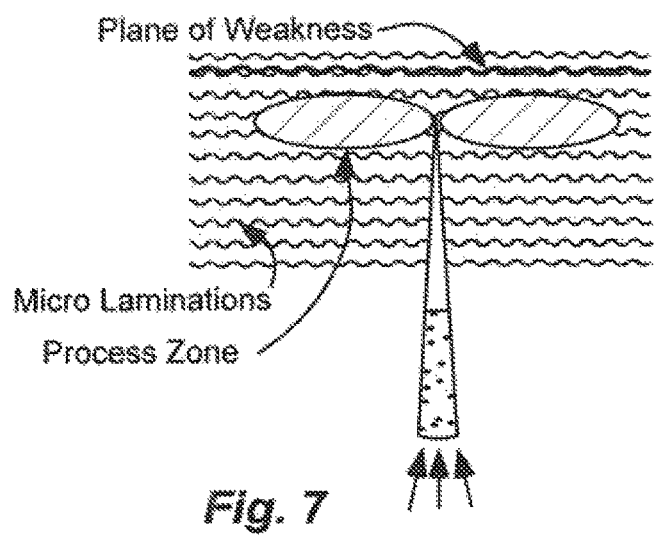
FIG. 7 is a schematic view of a process zone stress intensity profile with a fracture growing horizontally parallel to the laminations.

FIGS. 6 and 7 show suggested process zone stress intensity profiles that may occur. Assuming in this illustration that the layering at the micro scale is approximately horizontal, then different process zone patterns would be expected depending on whether the crack is growing vertically or horizontally. FIG. 7 shows the stress intensity profile that may exist for a fracture growing vertically across the laminations. FIG. 6 shows the stress intensity profile that may exist for a fracture growing horizontally parallel to the laminations. The size of these stress intensity profiles where slip has occurred is speculated as opposed to real observations, but is believed to be at least several centimeters.

A process zone at the crack tip is not new, and several calculations have included process zones in the crack propagation analysis. (Sometimes this region has been referred to as a "cohesive zone".) What is new, is the appreciation that the process zone is related to shear slip along the micro laminations, that the process zone is "anisotropic" (at least in some shales), and that different shales may have different process zones related to the micro lamination structure. No information is known regarding the re-adjustment of the pore fluids or pore pressure in this process zone region.

In any case, at some stage the damage in the process zone is sufficient to allow parting (separation) of the material. Stresses across the parting area must be at least zero, although the failure may be by extension rather than a pure tensile failure. The fracture propagates; that is, crack extension occurs.

Time Dependence of Process Zone Formation: The formation of the process zone for the shales, likely by shear slipping along the laminations (as noted above), may be time dependent. The slip along the laminations would require time to occur, and the formation of the process zone may result in the movement of pore fluids which would certainly be time dependent. Chemo-mechanical effects may also be part of the process—again time dependent.

Unfortunately no direct evidence is know regarding the time dependence, but some circumstantial evidence exists. For example, time dependence may be speculated in that fractures propagation observations sometimes suggest that the fracture is growing much slower than the Rayleigh wave speed (discuss below regarding velocity of the fracture fluid), and time dependence formation of the process zone would be an explanation. Another example suggesting a time dependence—on the scale of the fracture propagation—may be drawn from the numerous tri-axial stress plug tests. It is common to first load a plug sample to some hydrostatic stress to about the mean stress of the in situ shale (thousand of psi). Than at some later time (minutes to an hour) the test would progress by applying a shear stress to failure. In observing these tests, nearly all shale samples show some short-term deformation between the hydrostatic and shear stresses. Time for decay of the deformation at constant boundary loads, tends to be relatively short, and may be due at least in part to micro pore fluid equilibration.

Although the scale of the time dependence of the process zone formation is not known, it can be important. The crack can never "pass" the process zone; new process zone is formed as the crack grows. Thus if the process zone formation is time dependent, this would limit the crack growth velocity. In fact, if the process zone formation is sufficiently slow, it may allow the fracture fluid to more nearly keep up with the crack growth, and the crack would grow at the speed of the injection rate. Certainly different shales would be expected to have different process zone formation times, thus leading to different crack extension velocities.

Fracture Fluid Velocities During Fracture Propagation: Based on a conservation of mass, the fracture fluid velocity in the narrow fracture can be estimated as the fracture length grows away from the wellbore. The fracture width and the leak-off into the surrounding formative can be estimated. FIG. 8 shows fluid velocities in feet per second for different leak-off conditions for a shale with intermediate stiffness and estimated in situ stresses. The injection rate is 12 barrels per minute continuous at the wellbore of slick water as the fracture fluid. The estimated fracture widths are taken from a quasi-three dimensional planar fracture calculation with no height containment (approximately circular fracture). Three different leak-offs are shown, with the top line (0.001) no leak-off, the bottom line (0.003) leaking off about 50 percent by time the fracture has grown 50 feet from the wellbore, and the middle line (0.002) is an intermediate leak-off of about 25 percent. The fracture is taken as symmetrical around the wellbore; the "half length" is the distance of the fracture tip from the wellbore.

Fracture fluid velocities beginning a few feet away from the wellbore (not right at the wellbore) range from about 10 feet per second declining to about 1 foot per second at about 50 feet from the wellbore for a leak-off of nearly fifty percent by time the fracture has reached 50 feet from the well bore (the bottom line). If non-homogeneous fingering would occur (instead of homogeneous circular growth), it is estimated that the fluid velocity in the "finger" fracture extension would have to be upwards of one hundred times the fluid velocity for the homogeneous expanding circular fracture. The primary slowing of the fracture fluid velocities for a given injection rate and a given fluid is due to dispersion (increasing diameter of the fracture) and secondly to fluid leak-off. Fracture width variation is a small effect.

Understanding the range of fracture fluid velocities can be important. High fracture fluid velocities would lead to large pressure drops required to move different fluids through the narrow fractures. These pressure drops along the fracture for the high fluid velocities contribute to the complex fracture formation.

Fracture Fluid Properties: Although viscosity is well appreciated as a critical fracture fluid property affecting fracture propagation, compressibility and sound velocity (or density) of the fracture fluid are also critical properties. The density, viscosity, and compressibility for several potential fracture fluids—water, CO2 and certain foams are noted in Table 1.

TABLE 1

Critical Fracture Fluid Properties

| Fluid | Viscosity (cP) | Density (lb/gal) | Compressibility ($\times 10^{-6}\,psi^{-1}$) | Speed Sound (ft/s) |
|---|---|---|---|---|
| $H_2O$ | .4421 | 8.34 | 2.6 | 5383.53 |
| $CO_2$ | .0941 | 7.597 | 16.2 | 2241.54 |
| $N_2$ | .0322 | 3.017 | 55.1 | 1930.38 |
| 60% Foam | Table 2-B | 7.5 | 5.23 | 3975.23 |
| 70% Foam | Table 2-B | 7.79 | 6.31 | 3551.08 |
| 75% Foam | Table 2-B | 7.76 | 7.02 | 3373.21 |
| 80% Foam | Table 2-B | 7.71 | 7.92 | 3186.06 |

Viscosity (cP)

| | Shear Rate ($sec^{-1}$) | | | |
|---|---|---|---|---|
| Fluid | 200 | 800 | 1200 | 1400 |
| 60% Foam | 117 | 37 | 26 | 18 |
| 70% Foam | 120 | 46 | 34 | 26 |
| 75% Foam | 126 | 48 | 36 | 27 |
| 80% Foam | 127 | 49 | 36 | 30 |

Data on rheological properties of these selected fluids and a Matlab™ software tool were used to estimate fluid characteristics based on pressure, temperature, and fluid composition. Foam rheology was determined from a combination of pure fluid properties and an equation of state developed by Lord. Table 1 shows properties at a constant temperature of 150° C. and 7000 psi pressure. It is interesting to note that the difference in compressibility and speed of sound between fluids that may be thought of as gas versus a liquid do not vary so drastically under high pressure (at this temperature).

Supercritical CO2 and foams have attracted the attention of hydraulic fracturing operators (as alternatives to slick water) due to their unique and different properties. However, in considering the fluid properties it can be important to keep in mind that once past the critical pressure/temperature, the distinction between a gas and liquid doesn't exist. For example, from the phase diagram of CO2, it becomes clear that at high compression as would be the case for a fracture fluid and at modest reservoir rock temperatures, the CO2 properties do not change significantly except as discussed later, near the fracture tip where pressures may be low to even vacuum. Thus for CO2 a phase change may occur as the fracture is propagating as the pressure decreases in the fracture, particularly near the crack tip. For slick water no such phase change will occur except very near the crack tip where vaporization may occur. Such large changes in the fracture fluid properties between CO2 that may undergo a phase change and slick water could have a large impact on fracture propagation. Similar analogies can be drawn regarding foams versus slick water.

For comparisons to develop a better mental picture, Table 2 shows critical properties at reduced pressure of 500 psi and 150 F temperature. It is interesting to note that at 7000 psi compression and 150 F, CO2 has about 6 times the compressibility of water (Table 1). But at 500 psi, CO2 has about 550 times the compressibility of water (Table 2)—a very large difference. At 7000 psi compression and 150 F, water has only about 5 times the viscosity (in Centipoises) of CO2 (Table 1), and at 500 psi water has about 25 times the viscosity of CO2 (Table 2)—a much larger change in compressibilities.

TABLE 2

Critical Fracture Fluid Properties at Reduced Pressure

| Fluid | Viscosity (cP) | Density (lb/gal) | Compressibility ($\times 10^{-6}$ psi$^{-1}$) | Speed Sound (ft/s) |
|---|---|---|---|---|
| $H_2O$ | .4357 | 6.966 | 3.40 | 5117.8 |
| $CO_2$ | .01738 | .4336 | 1861 | 876.33 |

Fracture Fluid Pressure Drop along the Fracture: Calculations show fracture fluid pressure drop as the fluid is flowing in a narrow channel at high velocities. FIG. 9 shows the pressure drop versus the fluid velocity. This calculation is for water flowing in a 1 mm height channel with wall roughness estimated as sinusoidal irregularities with height of ten percent of the channel thickness.

For this case, pressure drop at 1 foot per second fluid velocity is about 15 psi per foot, while at 10 feet per second velocity pressure drop is about 340 psi per foot. And, at 100 feet per second velocity the pressure drop is about 1300 psi per foot. These pressure drops per foot would lower the net pressure in the fracture (the difference between the fracture fluid pressure and the rock pore pressure) significantly along the fracture length, particularly near the fracture tip even for click water. Considering that a net pressures as low as 50 psi has been claimed to cause a fracture to extend in the shales, the pressure drops per foot shown above are large.

The fracture surface roughness can be an important factor. Different shales show different fracture surface roughness—some relatively smooth and some much rougher. Also the fluid properties of viscosity and shale wetting or non-wetting can be key parameters and have yet to be considered in the calculations. The basis for these calculations note that the flow resistance will increase as the cube at the channel height decreases. Thus as the fracture width decreases huge pressure drops occur. The Reynolds number is critical and an increase in the pressure gradient versus velocity tends to occur at about 10 feet per second (for water) where the Reynolds number is a few thousand. It is clear that pressure drop along the fracture should be considered.

Planes of Weakness

The formation shale rock contains many discontinuities, some are weak in shear and tensile strength and are referred to as planes of weakness. Discontinuities can be visible in shale. As a fracture approaches and intersects a discontinuity, whether or not a plane of weakness, the fracture may continue across the discontinuity, it may stop and progress at some other location, it may progress along the discontinuity a short distance and then progress in its original direction (a "step-over"), it may branch and progress as two or more fractures in the same general direction, or it may progress along the discontinuity. How the fracture progresses can be important for creating the fracture network; some fractures will be desirable while other fracture patterns undesirable.

FIGS. 6 and 7 also show schematics of the fracture near the crack tip approaching a discontinuity. One should note that as a fracture propagates, that the process zone first interacts with the plane of weakness, before the "fracture" has arrived. One can logically assume that the process zone size and shape will affect how the fracture will ultimately interact with the interface. One can also logically assume that a fracture growing in steps might interact with an interface differently than a steadily growing fracture.

The interface shearing that must occur as the fracture approaches the interface may have "its process zone" just as the intersecting fracture has its process zone. One would ask whether the fracture propagation along the interface (if such occurred) is by steps or steadily propagating (the same phenomena as noted above for the main fracture). To a large extent only speculations can be made; however, this is at present the state-of-the-art.

The calculations although only approximations are helpful as guidance, but none of these calculations would appear to be correct from a physics point for shales. If a correct process zone is not considered, then the details of the dynamic process of the crack and fluid approaching and intersecting the interface would not be correct. Additionally the in situ stress state in the vicinity and across the discontinuity will be critical, and unfortunately is not known, nor is the in situ strength and stiffness of the interface. If there is a stress jump across the interface, that stress jump would tend to release locked in in situ stresses as shearing or parting occurred with fracture fluid entering, and so forth.

Laboratory Validation Tests

Laboratory tests were conducted to validate certain phenomena noted above. Tests tended to focus on breakdown, early crack initiation. The transparent materials (Plexiglas and glass) allow physical observation of the fracture pattern, while real rock better depicts the fluid driven fracturing in shale formations. CT x-ray observations have been made of both the transparent materials and of the shale tests. Numerous ideal fracture calculations have been made for these breakdown, early crack extension tests, almost always showing "good agreement". Unfortunately, one of the most critical parameters for such calculations is fracture toughness under high confining stresses, a parameter that is not easily determined for shale. Nevertheless, these past tests and fracture calculations are valuable and do show certain phenomena.

Tests here are aimed specifically at validating the role of pre-existing discontinuities on fluid flow into the discontinuity. Clear acrylic and a 3-D printed ceramic material were used. Hydraulic fracture tests were conducted using a tri-axial test system. Four inch diameter cylindrical samples with a one-eight inch diameter hole (simulating the borehole) were subjected to confining pressure around the sample, and an added axial load was applied to create a deviatoric stress on the sample. Fluid was then injected into the borehole until the sample fractured. A clear acrylic test sample was disposed between two steel end caps. For this test, the fracture initially grew outwards from the borehole in approximately equal "wings". One fracture wing stopped at the pre-cut slot in the sample (simulating a discontinuity, a plane of weakness) while the other fracture wing continued across the slot to the edge of the sample.

Clear acrylic and 3-D printed ceramic material samples have been tested. The 3-D printing allows "printing" continuities into the test sample, giving a high degree of flexibility for planes of weakness. This technique is new, but sample test material that can practically be printed is limited. This technique proved to be quite interesting.

The phenomena being validated was the leak-off of fracture fluid into shale discontinuities, as noted as transverse micro-fractures in FIG. 2. The 3-D printed sample tests—and to a lesser extent the clear acrylic sample tests—showed that fracture fluid penetration can occur into laminations (for the fluid used in the tests). This phenomena of transverse micro-fracture leak-off can be important to fluid driven fracture propagation in the shales. It is not well understood, nor well appreciated, by industry at present, and is discussed more below. Previous calculations, however, have suggested when fracture may result normal to the main fracture for ideal material.

Discussion—Problems Remaining

Clearly the first principle "main drivers", the observations noted, and the speculations presented provide insight into how a fluid driven fracture propagates in shale rock deep in the earth. This explains better how a complex fracture network is created, and suggests how fracture propagation may be manipulated in some desirable manner. As the fracture intercepts a discontinuity in the rock, a number of possibilities are possible as previously noted. Each possibility will create a different hydraulic fracture network, and each possibility offers the opportunity for hydraulic fracture improvements. Considering the above, several observations can be made.

a) The fluid driven fracture may propagate in steps or continuously, depending on the fracture fluid properties and the process zone formation. That said, it appears that the fracture fluid compressibility and density, as well as its viscosity, and the shale micro fabric can be important properties affecting the formation of the process zone at the crack tip and overall how the fracture will propagate. And, undoubtedly a fracture progressing by steps will intersect a discontinuity differently than a fracture that is progressing continuously.

b) Fractures will likely have a dry zone near the crack tip for shales. Fracture fluid will never reach thus region, and certainly not proppant. A "tip screen out" does not mean that proppant has reached the crack tip.

c) The process zone at the crack tip will be a damaged area due to shear slip along micro planes of weakness. The rock may compact in this region due to the far-field high compressive stresses, causing a redistribution of the pore fluids in the process zone. This process will undoubtedly be time dependent, and will vary with the shale. It seems clear that a fracture progressing parallel to the micro planes of weakness will have a very different process zone from a fracture progressing across the micro planes of weakness. Therefore, a shale with a strong orientation of micro planes of weakness will fracture differently than a shale without. The significance of this will vary depending on the shale, and will lead to different fracture propagation for parallel versus across the shale micro fabric.

d) For a shale where the process zone formation is more time dependent and/or for a fracture fluid that is more compressible, a continuous fracture propagation is more likely to occur—what some might call a ductile fracture requiring greater energy to create the fracture. While a shale where the process zone is not so time dependent and/or a less compressible fracture fluid might lead to fracture propagation in steps—and some might refer to this as a brittle fracture requiring less energy to create the fracture. For each case the complexity of the fracture would undoubtedly be different.

e) Based on fracture fluid velocities considering conservation of fluid mass and simple flow calculations, the pressure drop along the fracture can be significant particularly nearer the crack tip. Fracture fluid pressure drop within the fracture will contribute to the complexity of the hydraulic fracture network when considering conventional pumping rates. That is, the pressure drop in the fracture will be sufficient to cause the fracture fluid away from the pressure drop area, to create a new fracture emanating at a rock 'weak link', and the fracture will progress along this new path. The same will subsequently happen for the new path, and so forth. It should be remembered, however, that it is the shale fabric that is required in order to have complex fractures, irrespective of the pumping rates or fracture fluid.

f) Optimizing parameters of fracture fluid and pumping rate based on critical shale properties would allow manipulating fracture propagation. It seems clear that of the many field experiments trying new hydraulic fracturing concepts, and correlating with the production results (some successful and some not), that indeed fracture propagation manipulation is occurring. However, it is occurring uncontrollably and without understanding why. Considering first principles "main drivers", helps to better understand how these field fracturing concepts work and how to optimize them.

g) It should be understood that shale properties—including its fluids—and the in situ stresses are critical characteristics for fluid driven fracture propagation, and they are "givens". In general these should be accepted and are not variables, except that stress shadowing effects and pressure drawdown or maintenance do to some extent change the in situ stresses. The in situ stresses affects can be key. This invention has focused on the shale properties and on how the fracture propagation may be influenced be the variable of fracture fluid and pumping for given shale properties and given in situ stresses.

Conclusions—Implications for Fracture Propagation and "Designer Fraction Fluids"

This invention has focused on understanding fluid driven fractures in complex shales under high compressive stresses, with the intent of optimizing fracture fluids to help create the desire fracture network. The following implications for hydraulic fracturing are noted here:

1. It is widely accepted that the fracture propagation is greatly affected by the shale fabric. Additionally, fracture complexity is also dependent on the high pumping rates that are typically used (70-80 barrels per minute per fracture stage for example). It should be emphasized, however, that without the rock heterogeneity (including planes of weakness within the shale formation) complex fracture networks would not occur and the fracture would be directed exclusively by the in situ stresses.

2. It appears that for slick water the fluid flow in the fracture at pumping rates of about 15 barrels per minute per cluster is near a critical Reynolds number where the pressure drop in the fracture will contribute to more complex fracture networks. If not all clusters are taking fluid in a stage being pumped, then the injection rate into the clusters that are taking fluid—at a higher rate—may result in a fracture network quite different from where all clusters are equally taking fluid, because of the pressure drop in the fracture affect.

3. The fracture fluid's compressibility, and to a lesser extent density, can be important as well as fluid viscosity. Higher viscosities tend to create more complexity, while higher compressibilities may create less complexity. Fluids that can undergo fluid property changes—possibly even a phase change—due to pressure drop along the fracture will lend to greater fracture propagation manipulation.

4. Early laboratory tests conducted here tend to confirm how the creation of the transverse micro-fractures (see FIG. 2) occur. Such fractures create a large effective leak-off. "Plugging" the transverse micro-fractures using either a very fine proppant or other material—similar to a lost-circulation additive concept—could have a significant effect on the fracture propagation. Considering that may be as much as 50 percent slick water fracture fluid is lost to the transverse micro-fractures, changing this large effective leak-off will reduce water required.

5. For shales that exhibit high micro laminations, it will be more difficult for fracture propagation across these laminations versus propagation parallel to the laminations. If the laminations are approximately horizontal, this will lead to more elliptical height contained fractures; and conversely for laminations not horizontal. Furthermore, the micro laminations contribute to the size and shape of the process zone at the fracture tip (see FIGS. 6 and 7) affecting how fractures will interact with planes of weakness.

6. For shales that show a greater degree of micro creep, assuming this carries forward to a time dependence of the formation of the process zone, fracture propagation is more likely to be continuous as opposed to step progression, and will be less likely to cut across planes of weakness. For such a continuous progression the fracture will be more prone to step-over's and complex fracture networks. The converse is true. Continuous fracture propagation may be viewed as more ductile fracture, while step wise propagation may be viewed as more brittle propagation—this may be the real definition of ductile versus brittle fracturing.

7. Shales that create a more rough fracture face surface when fractured will show greater fluid flow pressure drop along the fracture. Surface roughness plays a strong role as the fracture width becomes small and fluid velocities are high. The net conclusion of the rough fracture face surface would be toward more complex fracture networks.

8. Fracture fluids play a large role in the formation of the hydraulic fracture network. It seems quite possible to optimize the fracture fluid properties to manipulate the fracture network to some extent as desired if the shale characteristics are known.

While the forgoing examples are illustrative of the specific embodiments in one or more particular applications, it will be apparent to those of ordinary skill in the art that numerous modifications in form, usage and details of implementation can be made without departing from the principles and concepts articulated herein.

What is claimed is:

1. A method for completing a wellbore, the method comprising:
   a) determining a fracture surface roughness for a given formation rock, and for a give fracture fluid or pumping schedule or both, prior to hydraulic fracturing;
   b) selecting a fracture fluid, or a pumping schedule, or both, based on the fracture surface roughness and formation characteristics; and
   c) pumping the fracture fluid into the wellbore to create a desired fracture network.

2. The method in accordance with claim 1, wherein determining a fracture surface roughness comprises obtaining a core sample of the given formation rock, and conducting a fluid fracturing test, or a mechanical wedging fracture test, or both, on the core sample.

3. The method in accordance with claim 1, wherein the selected fracture fluid, or the selected pumping schedule, or both, based on the fracture surface roughness results in a lower or a higher pressure drop along the fracture, as desired, to create a more productive fracture network.

4. The method in accordance with claim 1, wherein the selected fracture fluid, or the selected pumping schedule, or both, based on the fracture surface roughness favorably alters interaction of a fracture propagation with a discontinuity.

5. The method in accordance with claim 1, wherein the selected fracture fluid, or the selected pumping schedule, or both, based on the fracture surface roughness changes a complexity or a simplicity of the fracture network.

6. The method in accordance with claim 1, wherein the selected fracture fluid, or the selected pumping schedule, or both, based on the fracture surface roughness changes proppant transport through the fracture.

7. The method in accordance with claim 1, wherein the selected fracture fluid, or the selected pumping schedule, or both, based on the fracture surface roughness causes or minimizes proppant screen-out.

8. The method in accordance with claim 1, wherein the selected fracture fluid, or the selected pumping schedule, or both, based on the fracture surface roughness increases fracture length.

9. The method in accordance with claim 1, further comprising:
   a) determining a fluid-rock interaction, including wetting or non-wetting between a fracture surface and the fracture fluid; and
   b) selecting the fracture fluid based on the fluid-rock interaction.

10. The method in accordance with claim 9, wherein determining the fluid-rock interaction comprises obtaining a core sample of the given formation rock, and conducting a fluid wettability test on the core sample.

11. The method in accordance with claim 9, wherein the selected fracture fluid based on the fluid-rock interaction:
   a) results in a lower or a higher pressure drop along the fracture, as desired, to create a more productive fracture network;
   b) favorably alters interaction of a fracture propagation with a discontinuity;
   c) changes a complexity or a simplicity of the fracture network;
   d) changes proppant transport through the fracture;
   e) causes or minimizes proppant screen-out; and/or
   f) increases fracture length.

12. A method for completing a wellbore, the method comprising:
   a) obtaining a core sample for a given formation rock with formation characteristics;
   b) conducting a fluid fracturing test, or a mechanical wedge test, or both, on the core sample;
   c) determining a fracture surface roughness for the given formation rock based on the core sample;
   d) selecting a fracture fluid, or a pumping schedule, or both, based on the fracture surface roughness and the formation characteristics; and e) pumping the fracture fluid into the wellbore to create a desired fracture network.

13. The method in accordance with claim 12, wherein selecting the fracture fluid, or the pumping schedule, or both, further comprises selecting the fracture fluid, or the pumping schedule, or both, based on the given formation rock, and given stresses in the formation, to create the desired facture network.

14. The method in accordance with claim 12, wherein the selected fracture fluid and/or the selected pumping schedule based on the fracture surface roughness:
   a) results in a lower or a higher pressure drop along the fracture, as desired, to create a more productive fracture network;
   b) favorably alters interaction of the-a fracture propagation with a discontinuity;
   c) changes a complexity or a simplicity of the fracture network;
   d) changes proppant transport through the fracture;
   e) causes or minimizes proppant screen-out; and/or
   f) increases fracture length.

15. The method in accordance with claim 12, further comprising:
   a) determining a fluid-rock interaction, including wetting or non-wetting between a fracture surface and the fracture fluid; and
   b) selecting the fracture fluid based on the fluid-rock interaction.

16. The method in accordance with claim 15, wherein the selected fracture fluid based on the fluid-rock interaction:
   a) results in a lower or a higher pressure drop along the fracture, as desired, to create a more productive fracture network;
   b) favorably alters interaction of the fracture propagation with a discontinuity;
   c) changes the complexity or simplicity of the fracture network;
   d) changes proppant transport through the fracture;
   e) causes or minimizes proppant screen-out; and/or
   f) increases fracture length.

17. A method for completing a wellbore, the method comprising:
   a) determining a desired fracture surface roughness for a given formation rock prior to hydraulic fracturing;
   b) selecting a fracture fluid, or a pumping schedule, or both, based on the desired fracture surface roughness for the given formation rock and anticipated stresses in the formation; and
   c) pumping the fracture fluid into the wellbore to create a desired fracture network.

18. The method in accordance with claim 17, wherein determining a desired fracture surface roughness comprises obtaining a core sample of the given formation rock, and conducting a fluid fracturing test, or a mechanical wedging fracture test, or both, on the core sample.

* * * * *